June 25, 1957 G. SCHLAPP 2,796,806
AUTOMATIC TRACER CONTROL
Filed March 26, 1954 4 Sheets-Sheet 1

Inventor:
Georg Schlapp
Bailey, Stephens and Huettig,
Attorneys

June 25, 1957   G. SCHLAPP   2,796,806
AUTOMATIC TRACER CONTROL
Filed March 26, 1954   4 Sheets-Sheet 2

Inventor:
Georg Schlapp
Bailey, Stephens and Huettig,
Attorneys

June 25, 1957 G. SCHLAPP 2,796,806
AUTOMATIC TRACER CONTROL
Filed March 26, 1954 4 Sheets-Sheet 3

Inventor:

Georg Schlapp

Bailey, Stephens and Huettig,
Attorneys

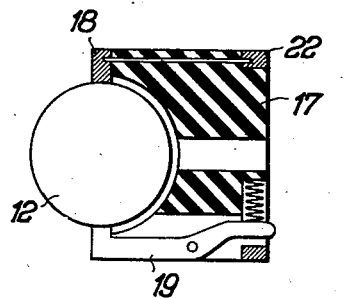
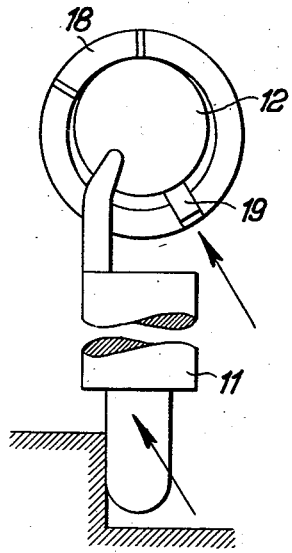
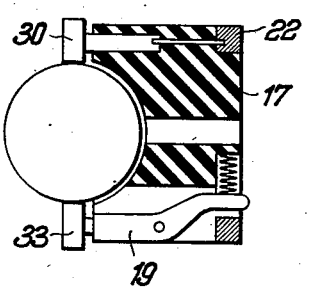
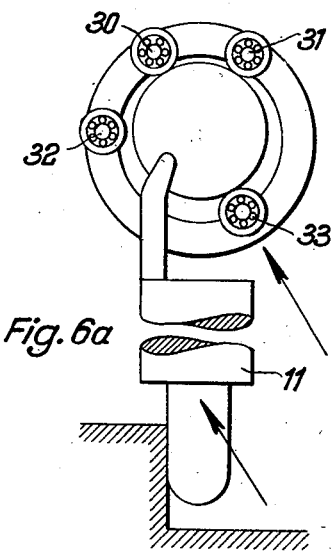

United States Patent Office 2,796,806
Patented June 25, 1957

2,796,806

AUTOMATIC TRACER CONTROL

Georg Schlapp, Langen, Frankfurt am Main, Germany, assignor to Hanns Fickert, Langen, Frankfurt am Main, Germany Application March 26, 1954, Serial No. 419,051

4 Claims. (Cl. 90—62)

The invention relates to an automatic tracer control especially for copying milling machines and similar machine tools and refers to improvements of the tracer in order to render it adapted for changing in a simple manner from straight line tracing to contour milling or profile tracing. The contact of the tracer with the master form is controlled by a rotary testing head alternatingly reversed from right to left rotation and vice versa by means of an automatic reverse clutch, said testing head having contact means adapted to cooperate with respective contact means connected with the tracer rod.

In accordance with the invention the testing head of the tracer device is formed in a special manner so as to be adapted to embrace a ball shaped member connected to the tracer rod. Over that the testing head is turnable in vertical direction by an angle of 90° around the middle axis of the said ball member of the tracer rod.

By this improved construction it is possible to allow the tracer to trace the master form or pattern in a vertical and straight line direction, while after having turned the testing head by an angle of 90° above the tracer, the axis of the tracer rod will coincide with the axis of rotation of the testing head in order to enable the tracer tip to trace the horizontal contours of a pattern. A further improvement according to the invention consists in providing the testing head housing comprising the testing head and its drive with studs mounted in the tracer housing with the axis of the said studs going through the center of the ball member connected to the tracer rod.

Another feature of the invention relates to the contact members of the testing head actuated by the ball member of the tracer which are formed as slide contacts. This means an advantage in so far as the contact can be produced very precisely in a simple manner.

In practicing the new automatic tracer control various forms of the invention may be employed, the accompanying drawings showing a preferred embodiment.

Figs. 1 and 2 are vertical sectional views of the novel tracer device comprising a tracer housing and a testing head with its drive at the top of said housing, Figs. 3 and 4 are vertical sectional views similar to Figs. 1 and 2 showing the testing-head housing turned by an angle of 90° overhead of the tracer for horizontally tracing of contours.

Figs. 5, 5a, 6 and 6a are details of the tracer device illustrated in Figs. 1 to 4.

Figure 2:
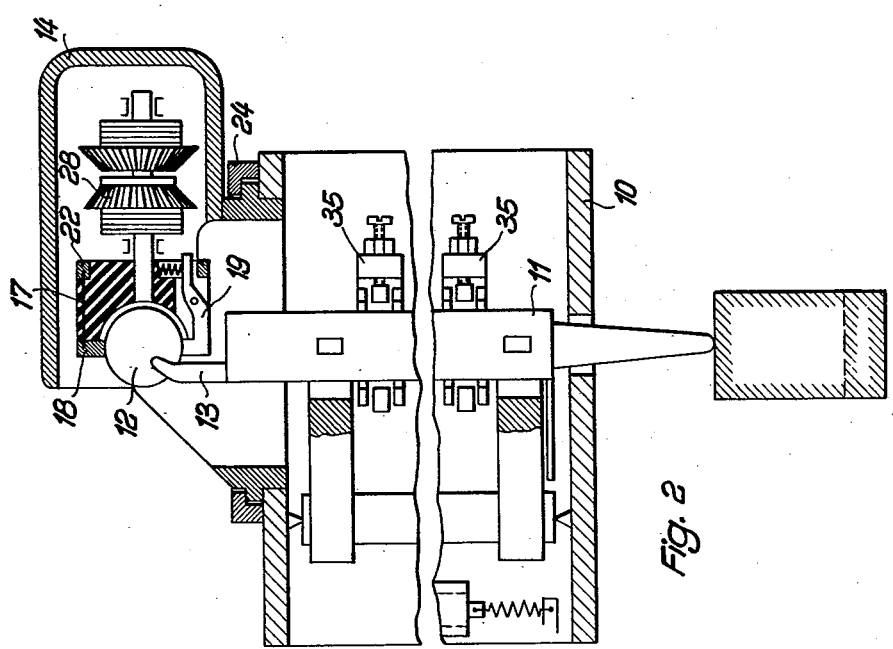
Figure 1:
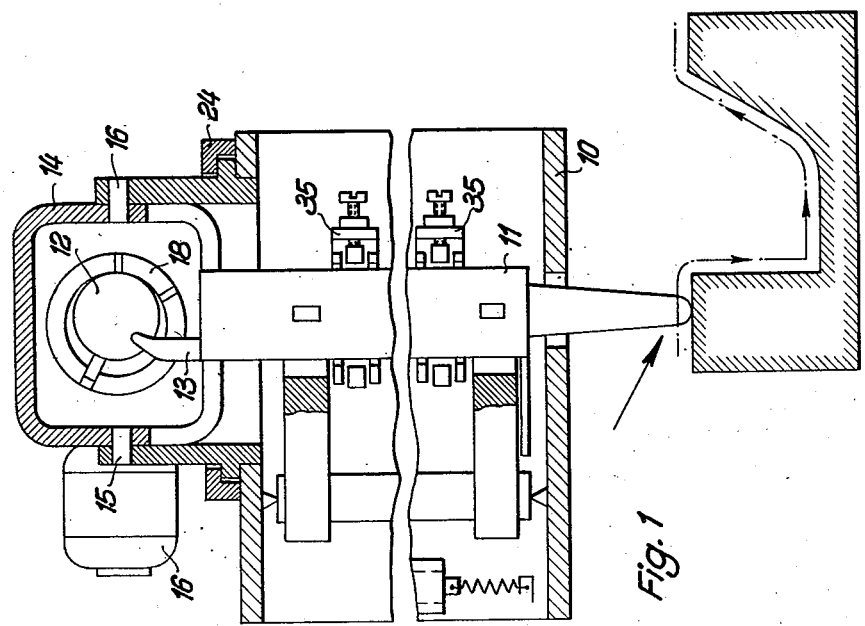
Figure 3:
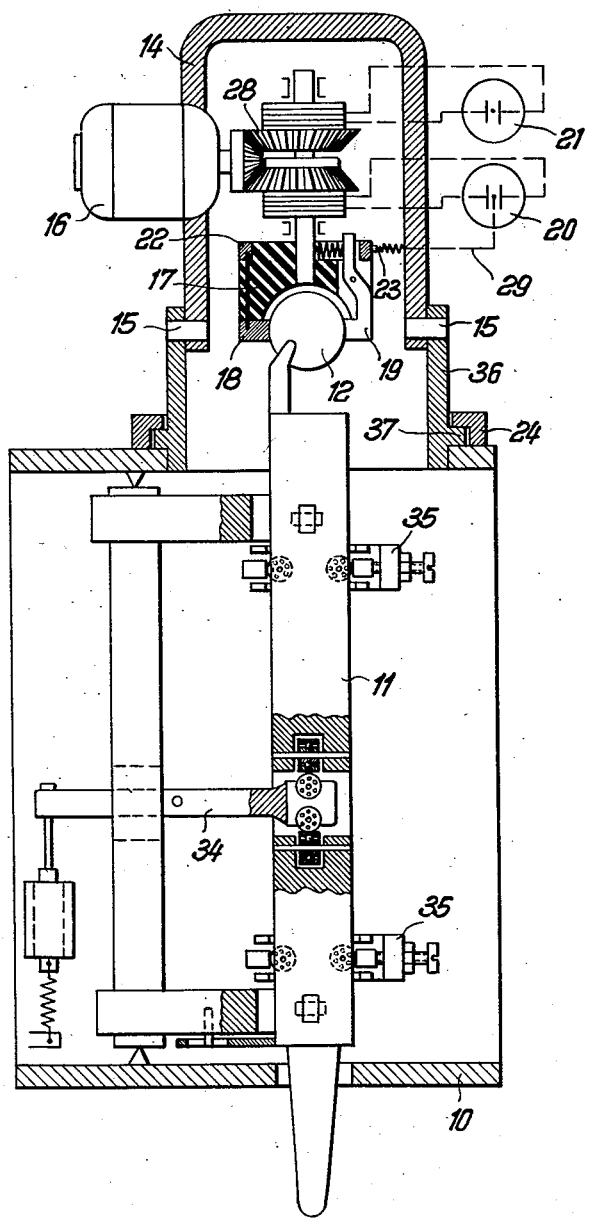
Figure 4:
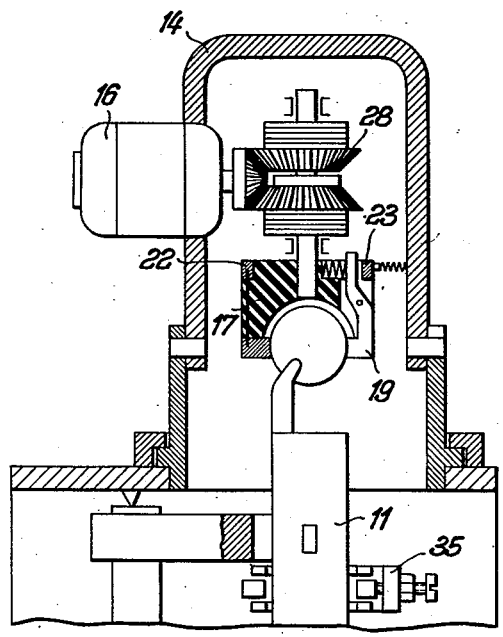
Fig. 4a is a vertical view on the tracer head.

In the tracer housing 10 a tracer rod 11 is movably suspended in all directions by levers 34 and forks 35. This movable suspension of the tracer rod is in detail fully illustrated and described in my copending application: S. N. 419,053, filed March 26, 1954, for "Guide Means for Three Dimensionally Movable Rods." These levers 34 and forks 35 are connected with control elements adapted to actuate feed pistons of the machine. The top of tracer rod 11 is joined to a ball shaped member 12 by means of a thin arm 13. The testing head housing 14 is attached to the tracer housing 10 by means of studs 15 in a manner as to allow the testing head housing to be turned from a horizontal position as shown in Figs. 1 and 2 to a vertical position as illustrated in Figs. 3 and 4. The housing 14 comprises an electric drive-motor 16 for the rotary testing head 17 and an electromagnetic reverse clutch 28 by means of which the testing head 17 is driven in alternating rotary directions. The testing head 17 comprises an annular contact member 18 embracing the ball member 12 so that the middle plane of the annular contact member 18 goes through the center of the ball 12. A spring loaded lever 19 urges the ball member 12 in contact with the annular contact member, the section 18 being conductively connected by a cable 29 or similar conductive means with the grid of an electron valve 20 (Fig. 3). The testing head body 17 preferably made of insulating material is provided with a conductive slip ring 22 conductively connected to conductive means 29 by aid of a contact member 23. The electron valve 20 and another electron valve 21 are adapted to control the rotary directions of the automatic reverse clutch 28. As soon as ball 12 will contact the contact member section 18 electron valve 20 will be ignited and the electromagnetic reverse clutch 28 and the testing head 17 embracing the ball 12 is switched to righthanded rotation. As long as the tracer has no contact with the pattern these righthanded revolutions of the testing head will produce a little circular movement of the tracer pin point. When the tracer point is brought to contact the pattern by way of example by a hand actuated guide rod or the like at the beginning or during the milling process, the center of the ball member 12 goes into the center of the contact member i. e. the center of the testing head 17. During these operations the righthanded revolution of the clutch 28 is maintained until the tracer begins to travel out. At this moment the ball member 12 loses contact, so that valve 20 is quenched and valve 21 is ignited. Valve 21 actuates the other half of the clutch 28 so that motor 16 will now turn the testing head in a left hand direction. This lefthanded revolution of the head will be maintained until ball member 12 will recontact annular contact member section 18 whereupon the head will rotate again in a righthanded direction. The above mentioned electromagnetic reversing clutch is fully described in all its details in my copending patent application S. N. 419,052, filed March 26, 1954, now abandoned for "Electromagnetic Reversing Clutch."

When testing head housing 14 is located in the position shown in Figs. 1 and 2 (in Fig. 2 the lower part of the tracer housing is shown turned around a vertical axis by an angle of 90° compared with Fig. 1) the tracer is allowed to perform vertical movements for working in the straight line or parallel stroke milling process.

The sleeve 36 supporting the bearings for the horizontal studs 15 is provided with a horizontal annular flange 37 by aid of which the said sleeve is supported in an annular ring bearing means 24 so as to be adapted to become adjusted in any relative angular position to the tracer housing. This means give the facility to let the tracer work in any horizontal direction during the straight line milling process.

In case the testing head housing is tilted up by 90° from the horizontal position according to Figs. 1 and 2 into the vertical position as shown in Figs. 3 and 4 by a horizontal axis through the center of the ball member 12 of the tracer the axis of the latter will coincide with the axis of rotation of the testing head 17. In this position of the testing head the tracer is enabled to travel out in any direction in a horizontal plane that means to work in a contour milling process.

Figure 4A:
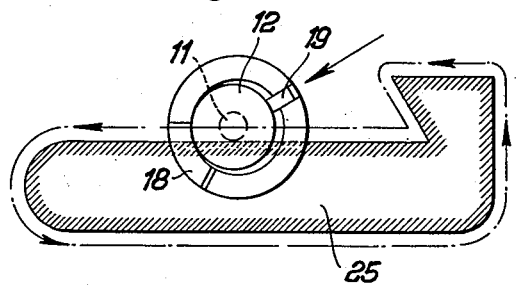

Lower part of Fig. 4a shows tracer 11 touching the contour of a pattern 25. The tracer can wander along the whole contour in a horizontal line as indicated by the arrows. It will be understood, therefore, that this movement of the tracer is impossible if testing head housing 14 is situated in a horizontal position according to Figs. 1 and 2. On the other hand it is easily to be understood, that tracer 11 cannot travel out in a vertical direction and accordingly cannot work in straight line milling while in a position according to Fig. 4.

It may be seen from the drawings and the foregoing specification that testing head housing can be adjusted in any desired angle position between the horizontal adjustment of Figs. 1 and 2 and the vertical position of Figs. 3 and 4. That means that the automatic control means according to this invention allows the tracer to trace straight lines as well as contours in any desired angular plane.

Figs. 5 and 6 illustrate different examples of the contact means in the testing head 17.

In Fig. 5 contact means sector 18 is arranged in a full ring which is interrupted at one place by a spring loaded lever 19. The body 17 may be made of electrically insulating material while the section 18 of the ring is made of conductive material and is conductively connected to slip ring 22.

In case of embodiment shown in Figs. 6 and 6a the ring shaped contact means of Figs. 5 and 5a are replaced by a number of antifriction bearings 30, 31, 32, 33. It will be understood from the drawings that bearing roller 33 is connected to spring loaded lever 19 while bearing roller 30 is electrically connected to slip ring 22, the same way as has been indicated with regard of section 18, slip ring 22 activates valves 20 and 21 which are alternatingly ignited or quenched as has been explained in the foregoing specification.

Obviously numerous modifications may be made in the structure illustrated and described as a preferred embodiment without departing from the invention.

What I claim is:

1. An automatic tracer rod control comprising a tracer rod, lever means for movably supporting said rod in contact wtih a pattern, a ball-shaped member carried on the head of said rod, a testing head surrounding said ball, resilient means for urging said head into contact with said ball, testing head housing means carrying said testing head, and means for turning said housing to rotate said testing head about an axis passing through the center of said ball.

2. An automatic tracer rod control as in claim 1, further comprising a tracer rod housing, and said means for turning said tracer head housing comprising studs secured to said tracer head housing and carried on the upper part of the tracer rod housing with the axis of said studs passing through the center of said ball.

3. An automatic tracer rod control as in claim 2, said testing head further comprising an annular member in sliding contact with said ball.

4. An automatic tracer rod control as in claim 2, said testing head further comprising anti-friction rollers carried by said testing head in contact with said ball.

References Cited in the file of this patent

UNITED STATES PATENTS

| 2,007,899 | Shaw et al. | July 9, 1935 |
| 2,313,989 | Caldwell et al. | Mar. 16, 1943 |
| 2,334,956 | Ridgway | Nov. 23, 1943 |

FOREIGN PATENTS

| 508,743 | Great Britain | July 5, 1939 |
| 512,234 | Great Britain | Aug. 30, 1939 |